US009047234B1

(12) United States Patent
Nara et al.

(10) Patent No.: US 9,047,234 B1
(45) Date of Patent: Jun. 2, 2015

(54) DATA CONTEXT PASSING BETWEEN NON-INTERFACED APPLICATION PROGRAMS IN A COMMON FRAMEWORK

(75) Inventors: Vijay Nara, Princeton, NJ (US); Michael Russin, East Rockaway, NY (US); Yevgeny Kolyakov, Brooklyn, NY (US); Rembrandt Kuipers, Surrey (GB)

(73) Assignee: THOMSON REUTERS (MARKETS) LLC, New York, NY (US)

( * ) Notice: Subject to any disclaimer, the term of this patent is extended or adjusted under 35 U.S.C. 154(b) by 1148 days.

(21) Appl. No.: 11/758,079

(22) Filed: Jun. 5, 2007

Related U.S. Application Data

(60) Provisional application No. 60/811,515, filed on Jun. 5, 2006.

(51) Int. Cl.
 G06F 15/16 (2006.01)
 G06Q 30/02 (2012.01)
 G06F 17/30 (2006.01)

(52) U.S. Cl.
 CPC ............... *G06F 15/16* (2013.01); *G06F 17/30* (2013.01)

(58) Field of Classification Search
 CPC ................ G06F 17/30861; G06F 17/30572; G06F 17/3089; G06F 17/30893; G06F 2221/2119; G06F 17/30887; H04L 67/02; H04L 29/0809; H04L 67/2814; H04L 29/12066; H04L 61/1511; H04L 61/301
 See application file for complete search history.

(56) References Cited

U.S. PATENT DOCUMENTS

| | | | |
|---|---|---|---|
| 6,687,746 B1 * | 2/2004 | Shuster et al. | 709/223 |
| 7,734,730 B2 * | 6/2010 | McCanne | 709/219 |
| 8,224,994 B1 * | 7/2012 | Schneider | 709/245 |
| 2001/0047429 A1 * | 11/2001 | Seng et al. | 709/245 |
| 2001/0054020 A1 * | 12/2001 | Barth et al. | 705/37 |
| 2002/0133518 A1 * | 9/2002 | Landsman et al. | 707/513 |
| 2002/0147848 A1 * | 10/2002 | Burgin et al. | 709/246 |
| 2005/0010653 A1 * | 1/2005 | McCanne | 709/219 |
| 2006/0031404 A1 * | 2/2006 | Kassab | 709/218 |
| 2006/0155780 A1 * | 7/2006 | Sakairi et al. | 707/201 |
| 2007/0016570 A1 * | 1/2007 | Punaganti Venkata et al. | 707/4 |
| 2007/0239528 A1 * | 10/2007 | Xie et al. | 705/14 |

* cited by examiner

Primary Examiner — Tuan Dao
(74) Attorney, Agent, or Firm — Kelley Drye & Warren LLP; Alan D. Gardner

(57) ABSTRACT

Permitting the context sharing between non-interfaced web-based applications associated in a web-based framework server via adjusting the parent domain of the web-based applications and the framework to be the same, providing in the framework server the location of a JavaScript file, and configured to permit communication between the web-based applications through http function calls. The location of the JavaScript file may be provided to all the applications in the form of a cookie. Alternatively permitting context sharing between non-interfaced web-based applications associated in a web-based framework server comprising selectively adjusting the domain of the web-based applications and the framework such that each defines a subdomain of a parent domain when the web-based applications are being navigated.

21 Claims, 6 Drawing Sheets

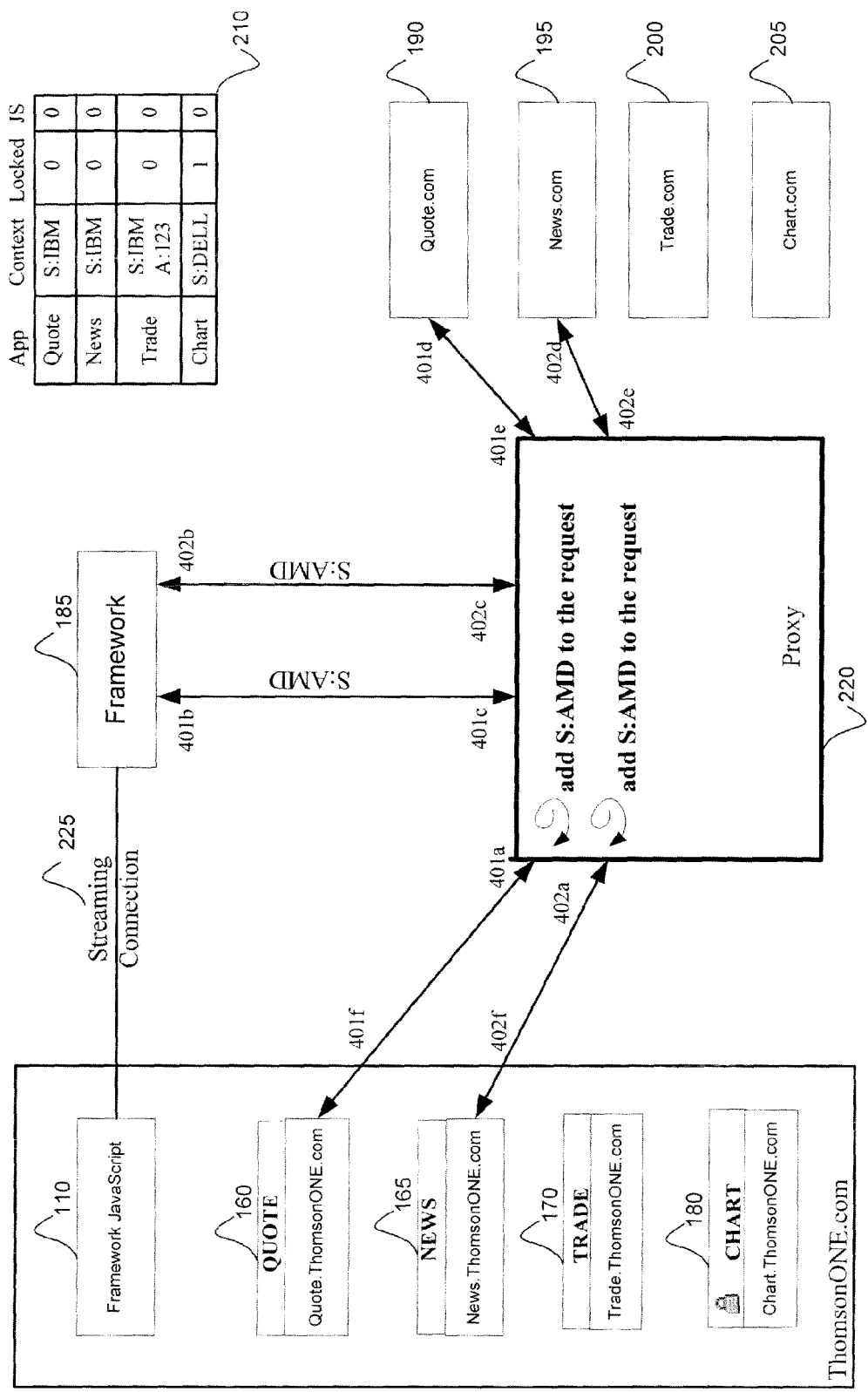

DATA CONTEXT PASSING BETWEEN NON-INTERFACED APPLICATION PROGRAMS IN A COMMON FRAMEWORK

CROSS-REFERENCE TO RELATED APPLICATIONS

This application claims benefit of U.S. Provisional patent application Ser. No. 60/811,515, filed Jun. 5, 2006, the contents of which is incorporated by reference herein in its entirety.

BACKGROUND OF THE INVENTION

1. Field of the Invention

The present invention generally relates to passing data input, with respect to one of two or more differently-domained, non-interfaced, application programs in a common framework, between applications within the framework.

2. Description of the Related Art

In computing, a framework is a defined support structure in which another software project can be organized and/or developed. In computer programming, an application framework is a term usually used to refer to a set of libraries or classes that are used to implement the standard structure of an application for a specific operating system.

When separate pieces of software desire to interact with one another, an interface is generally necessary to be provided. The interface may have many different characteristics including tightness of coupling, language independence and a communication mechanism. Relatively tightly coupled interfaces require a change whenever a change is made to one of the pieces of software. Typically the same language needs to be used for the interface as the language used for the pieces of application software. The communication mechanism relates to the ability of an interface to allow pieces of software to call one another in the same memory space or communication network.

As opposed to earlier types of client-server computing wherein each application had its own client program which served as its user interface and had to be separately installed on each user's computer, many applications today are accessed through the World Wide Web or similar web, so called "web applications" or "webapps." A webapp is an application that's accessed with a web browser over a network such as the Internet or an intranet. Webapps are popular due to the ubiquity of the browser as a client, sometimes called a thin client, and the ability to update and maintain webapps without distributing and installing software on may client computers. Webapps dynamically generate a series of web pages in a standard format such as HTML/XHTML, supported by common browsers where the browser acts as the universal client. Client-side scripting in a standard language such as JavaScript is commonly included to add dynamic elements to the user interface.

The World Wide Web comprises a system of internet servers that support documents in HyperText markup Language ("HTML") which support links to other documents. Access to sites on the World Wide Web (the "web") is by means of a Uniform Resource Locator (URL), a string of characters conforming to a standardized format which refers to a resource by its location on the internet. Attached to the URL may be a query string, specifying data to be passed to a Web Server program (for example, a Common Gateway Interface ("CGI") program, ASP, ASPX, php, etc.), comprising a standard protocol for interfacing external application software with a web server (allowing the server to pass requests from a client web browser to the external application). The URL includes a domain name which consist of memorable words that through lookup in the global Domain Name System is converted to the numeric IP addresses (the unique number used to identify a particular network device, router, computer, printer etc., that is, its address in the network) that allow for communication with a particular address. The Domain Name by convention consist of two or more parts separated by dots with the rightmost label conveying the top-level domain (for example, "ti.thom.org" has the top-level domain "org") and each left portion separated by dots specifies a subdomain of the parent domain, the first most left being referred to as the second-level domain name, the next most left, the third-level domain etc. A domain name that has one or more associated IP addresses is called a hostname (e.g., "ti.thom.org" and "thom.org" domains are both hostnames).

Information may be displayed at the client side in a number of HTML frames, which may be independent windows or subwindows, allowing certain information to be visible while other views are scrolled or replaced (e.g., in the same window, one frame might include a navigation window, one a static banner, and one a scrollable document). Inline HTML frames such as frames within text are referred to as Iframes.

Access to materials on the World Wide Web may be improved by interface of a proxy server between the client and web server, allowing access to a resource either by connecting to a specified server or servicing the resource directly from its cache. Reverse proxy servers, that is proxy servers installed in the neighborhood of one or more webservers, may also be used to improve speed of access of materials on the web by caching static content like pictures and other static graphical content, in aiding in load distribution to several webservers and performing Secure Sockets Layer (SSL) encryption in a more accelerated manner than the webserver could do itself. The proxy server may also perform webapp processing making the client in the client-server architecture network a so-called thin client in depending primarily on the proxy server for processing activities (as opposed to a thick client were the client does as much processing as possible and passes only data required for communications and archival storage to the server).

Many obstacles exist in trying to transfer data processable in more than one World Wide Web-based application in a framework when an appropriate interface between the applications has not been designed. For example, in Java context passing may be implemented by adding an argument to each method so that a value (i.e., context) is passed down the call stack to methods that require it. However, inter-communication between framework applications in a web-based system by means of JavaScript function calls would only be permitted if the framework and incorporated application programs were in the same domain. If both were in the same domain, that is having a single IP address, during navigation of the web, problems such as the overwriting of each other's cookies, and the limitation of the number of cookies per domain could arise.

There is a need for independent webapps within a defined framework to pass information between each other without the need for the writing of complex interfaces.

SUMMARY OF THE INVENTION

There is provided herein a method for permitting context sharing between non-interfaced web-based applications associated in a web-based framework server comprising: (a) adjusting the parent domain of the web-based applications and the framework to be the same; (b) providing in the framework server the location of a JavaScript file, configured to permit communication between the web-based applications through http function calls. The location of the JavaScript file may be provided to all the application in the form of a cookie.

In further embodiments, there is provided:

A method for permitting context sharing between non-interfaced web-based applications associated in a web-based framework server comprising: (a) selectively adjusting the domain of the web-based applications and the framework such that each defines a subdomain of a parent domain when the web-based applications are being navigated, and each is the same when the web-based applications are not being navigated; (b) providing in the framework server the location of a JavaScript file, configured to permit communication between the web-based applications through function calls, to each of the web-based applications. The location of the JavaScript file may be provided to all the application in the form of a cookie.

A method in an web-based application framework server, having two or more non-interfaced integrated web-based applications and capable of hosting JavaScript files, for passing data between the web-based applications comprising: (a) causing the top level and second level domain of the domain name within the URLs designating the framework and the integrated applications(s) to be the same; (b) selecting a third level subdomain to define all integrated application(s) coming from a single IP address; (c) including the selected subdomain for each integrated application in the URL definition of the integrated application(s); (d) pointing the DNS entry of the domain name of the URL of each integrated application to the same IP address; (e) providing each integrated application(s) in the framework server a cookie defining the location of a JavaScript file on the framework server configured to permit communication between integrated application(s).

BRIEF DESCRIPTION OF THE DRAWINGS

FIG. 6 is a flow chart diagram representing an exemplar situation using a method embodiment of the present invention.

DETAILED DESCRIPTION OF THE INVENTION

The present invention provides in a thin framework context passing between two or more web applications.

Web applications in a common framework may be integrated through communication by means of JavaScript function calls. Because of the restrictions on cross domain scripting, both the framework and web application would have to be in the same domain for such JavaScript function call communication. However, having the same domain may raise issues in the processing such as: (a) the framework and all the applications in the framework would resolve to a single IP address; (b) the framework and applications could overwrite each other's cookies; (c) all applications within the framework would have a limit on the number of cookies, that is, cookies per domain would be limited; (d) the connection to an application would contribute to the total HTTP 1.1 limit of two per host. Fortunately framework and the applications contained therein don't have to be all in the same domain at the time of the navigation. They can all be sub domains of a common parent domain, they can then change their domain on the client side to be the same parent domain and JavaScript each other. By selective choice of sub domains the applications can communicate with each other without such processing errors.

EXAMPLE I

For example, suppose an application is integrated with the URL http://www.xyz.com/apppath?param=value and the DNS for www.xyz.com points to 167.68.24.98. One could pick a sub domain for this application. This can be any, so far unused sub domain. If more than one application available at www.xyz.com is integrated into the framework, the same sub domain name would have to be reused. Assume selection of the sub domain "xyz." If the sub domain for an integrated application is determined to be xyz, the next step is to include the sub domain in the application definition, as shown in the following example:

<URL>
  <Cluster>xyz</Cluster>
  <FilePathAndQueryString>/apppath?param=value
</FilePathAndQueryString>
</URL>

For the above application definition, framework would set the URL for this application to be http://xyz.ThomsonONE.com/apppath?param=value. If an appropriate DNS entry is made for the application, communication between applications can occur without significant drawbacks.

Figure 1:
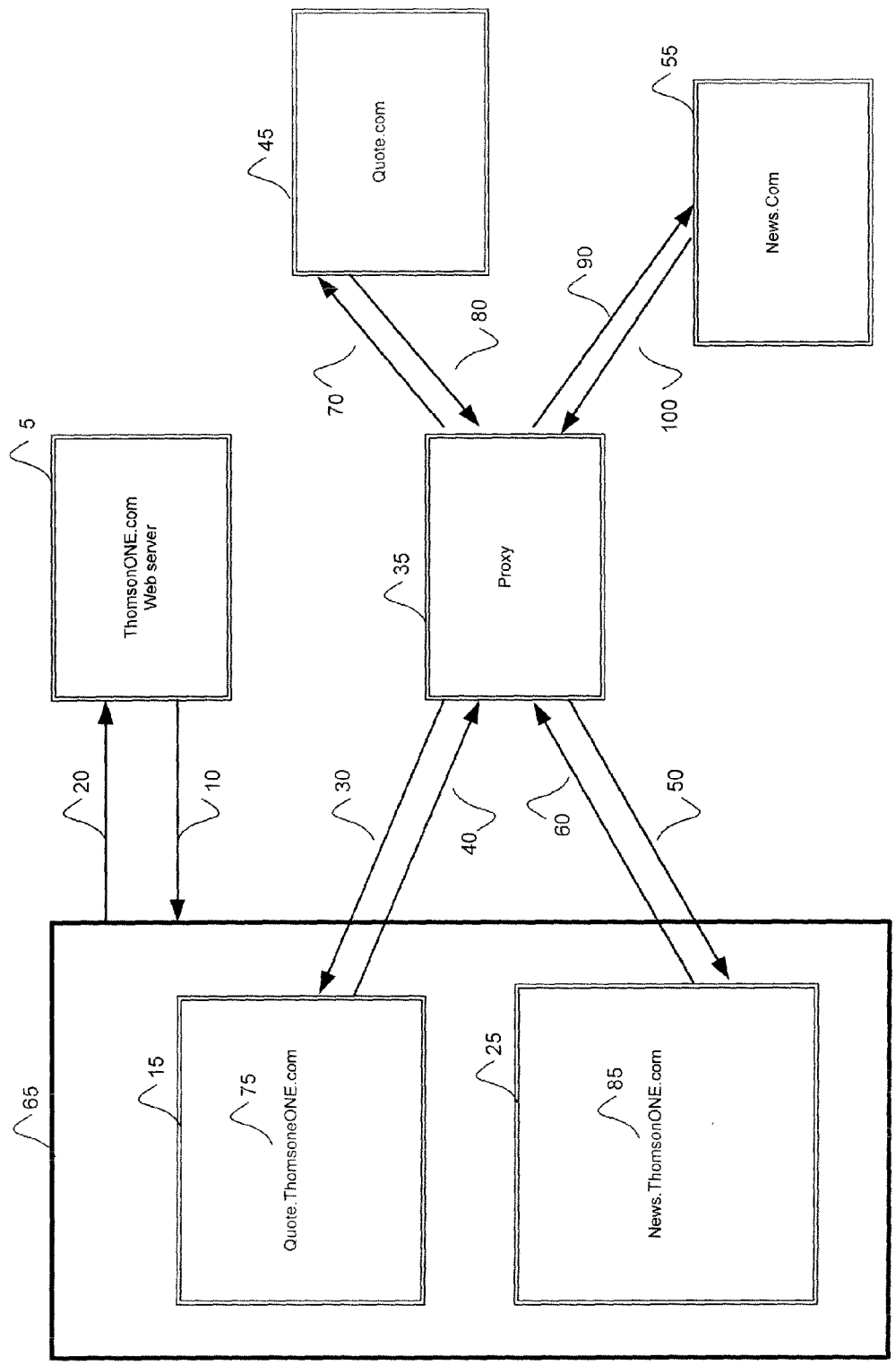
FIG. 1 is a flow chart diagram representing in schematic a method embodiment of the present invention.

Now turning to FIG. 1, there is shown in schematic a method embodiment for permitting context passing of information in between frames running information from different applications. In response to a user request at step 20, framework server 5 at step 10 sends framing instructions to browser 65 to set up frames 15 and 25. The domain names of applications to be run in each of frames 15 and 25 is modified to make web server 5 domain the parent domain of each application's domain name, and to make the prior parent domain of the actual website a subdomain, as seen in domain names 75 and 85 respectively. At steps 60 and 40, each of frames 25 and 15 respectively seeks information from proxy server 35 which in turn make request 70 and 90 to application sites 45 and 55 to obtain information returned by steps 80 and 100 to the proxy 35. The information obtained is based on the subdomain information of the URL requests received, and returns such information into the appropriate frame via steps 30 and 50.

Figure 2:
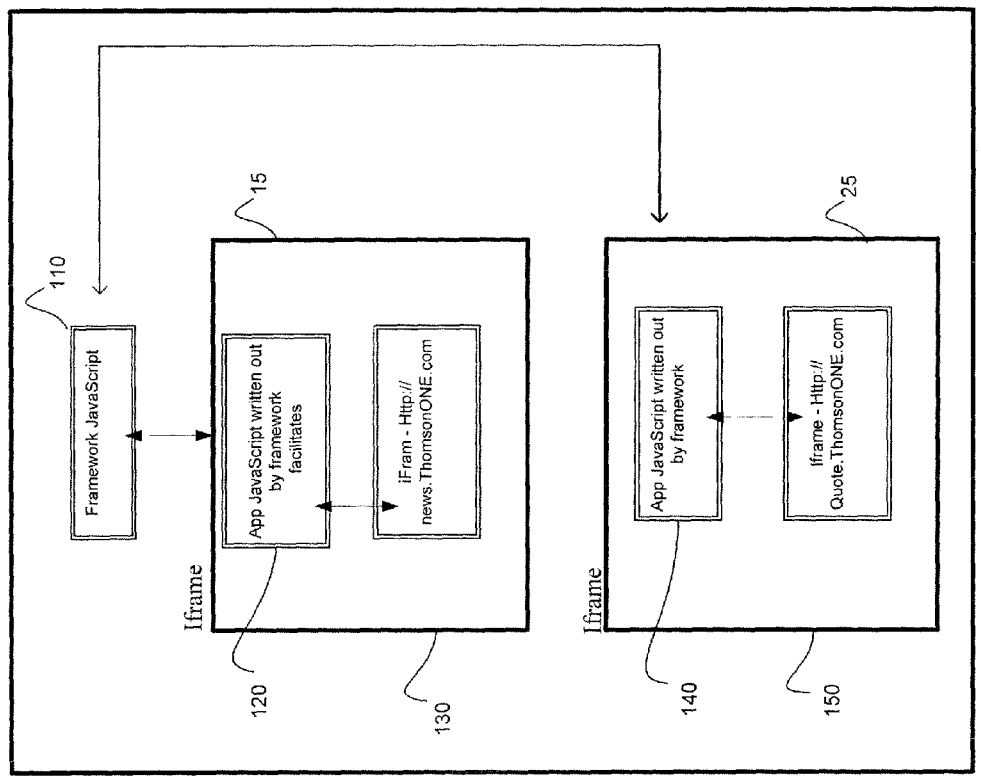
FIG. 2 is a flow chart diagram representing in schematic a further method embodiment of the present invention.

As shown in FIG. 2, by employing appropriate JavaScript from framework server 5 (not shown), that is framework JavaScript 110, content retrieved from proxy 35 (not shown) can be scanned from information reported by application JavaScript 120 and 140, which may be written out by framework facilities, which is to be continuously updated and/or dynamically updated in windows 130 and 150 of iFrames 15 and 25 respectively. Context thus can be shared given the common parent domain name in each iFrame.

As would be understood by one of ordinary skill in the art, wherein the term "JavaScript" is used herein, other types of executable programs having similar functionality could be used.

Figure 3:
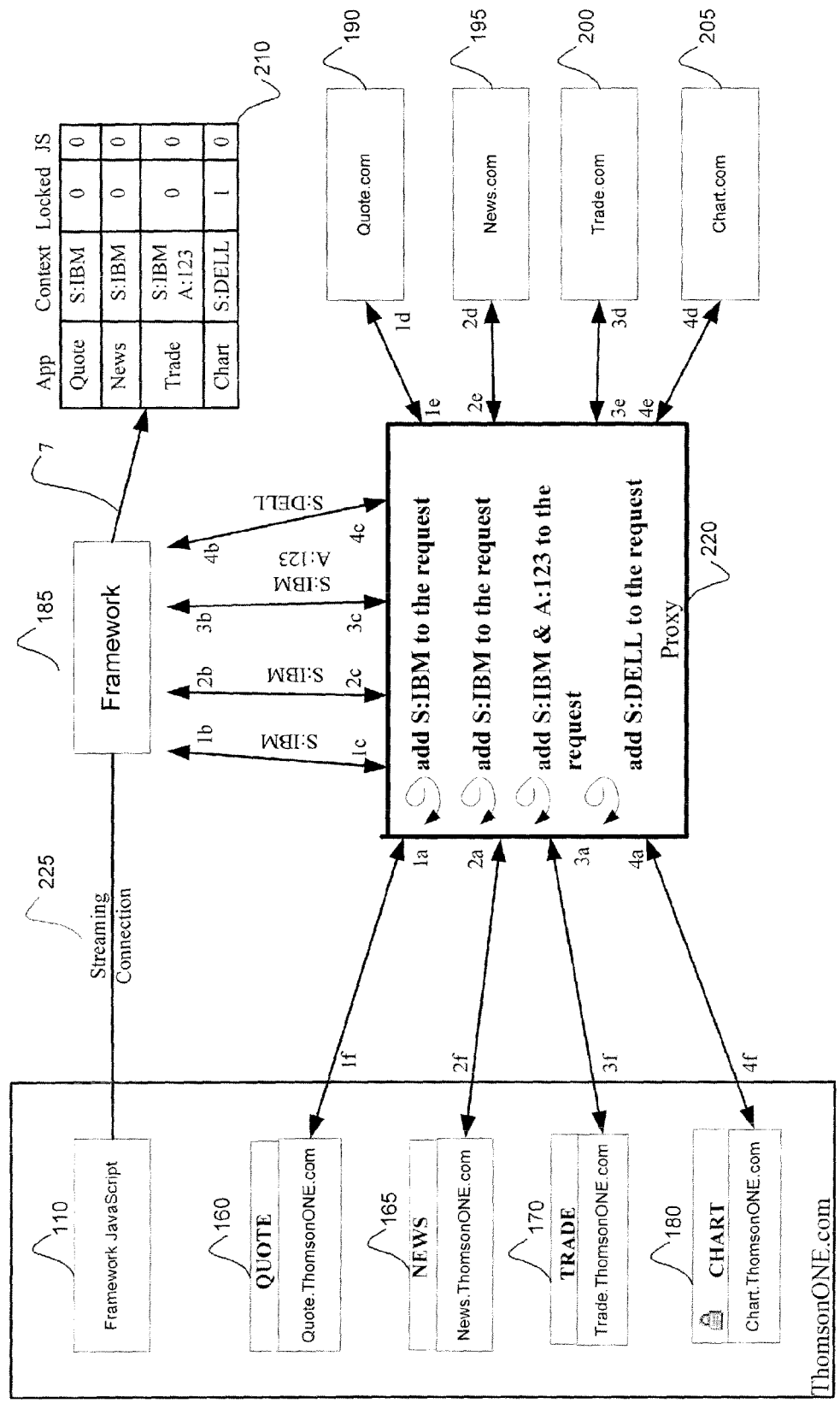
FIG. 3 is a flow chart diagram representing an exemplar situation using a method embodiment of the present invention.

Turning to FIG. 3, there is shown a flow chart of an exemplar situation in context passing using an embodiment of the present invention. Framework Javascript 110 sets a streaming connection with framework server 185 which sets up a number of frames on the display screen, in this case the frames encompassing application Quote 160, application News 165, application Trade 170, and application Chart 180. Each content in each frame is set via parameter settings 210 of Framework 185, which parameters as shown in 210 relate to whether the content of each frame is locked from any automatic updates (locked=1) or (unlocked=0) and whether the content requires any updating through streaming connection 225 to the JavaScript associated (not shown) with one or more application in the frames. In the example, application Quote 160 at 1a, News 165 at 2a, Trade 170 URL at 3a set at browser includes additional values filled in by proxy server 220 after retrieving parameters from the framework. Proxy server 220 fills additional information for symbol IBM information to framework 185 which queries parameter setting 210 to determine what information may be added to each application request. Requests for IBM symbol data not being locked (locked=0) in parameter setting 210, nor requiring JavaScript for updating data (JS=0) informs proxy server 220 to permit symbol IBM information to be retrieved from application servers Quote.com 190, News.com 195, Trade.com 200, and Chart.com 205 and transmitted to proxy server 220 via 1e, 2e, and 3e and from proxy server 220 to each application via 1f, 2f, and 3f. Request pursuant to application Chart for symbol Dell being sent via 4a to proxy server 220 is transmitted to framework 185 which adjudges from parameter setting 210 that such content is locked (locked=1) and can not be added as updated information from Chart.com 205. Request from the proxy 4e and return of information via 4d and 4f is therefore not made use of.

Figure 4:
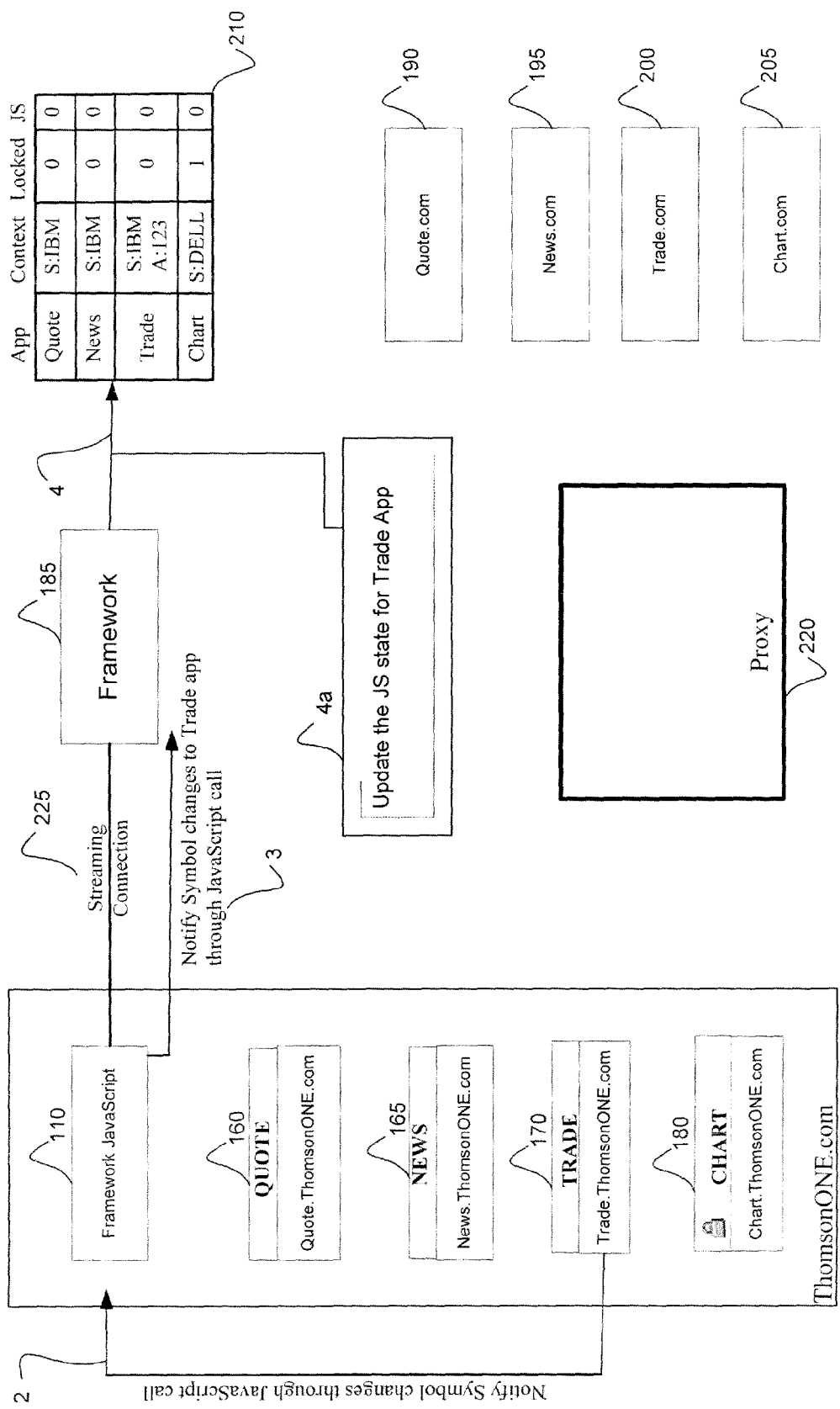
FIG. 4 is a flow chart diagram representing a further exemplar situation using a method embodiment of the present invention.

Turning to FIG. 4, there is shown a symbol change in application Trade 170 which via a JavaScript call at 2 notifies Framework JavaScript 110 of the change, which via connection 3 notifies framework 185 of changes to application Trade via a JavaScript call. Framework 185 alters specification parameters 210 such that the JavaScript value changes to 1 updating the JavaScript state for the application Trade.

Figure 5:
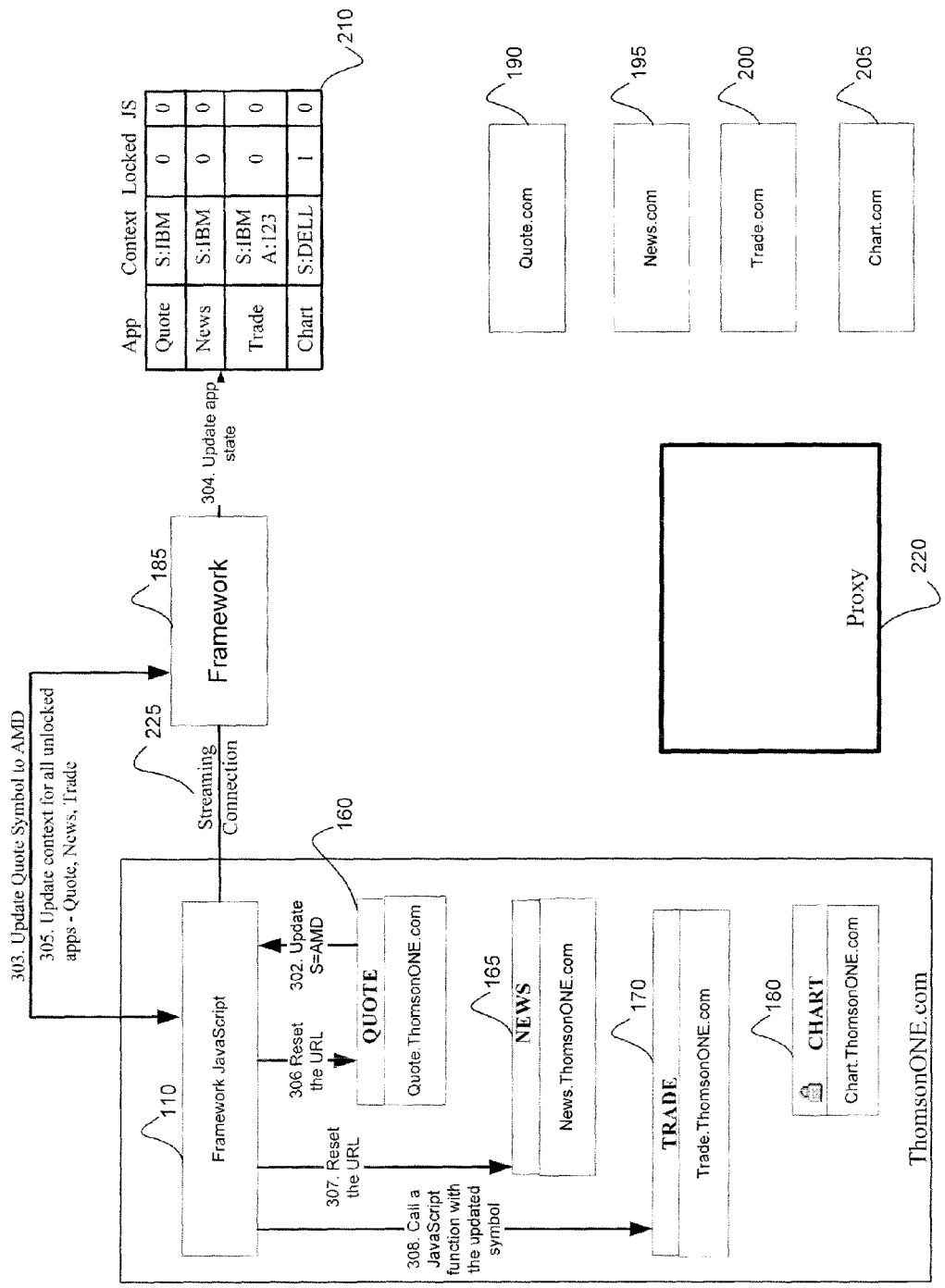
FIG. 5 is a flow chart diagram representing a still further exemplar situation using a method embodiment of the present invention.

Now turning to FIG. 5, there is shown diagrammatically an exemplar change of one symbol (IBM) to another symbol (AMD) in applications Quote, News and Trade. As shown, in Quote 160, user enters AMD causing via 302 a request of framework JavaScript 110 to request via 303 update of the quote symbol from IBM to AMD for each frame. Framework 185 alters via 304 the application state in application Quote, News, and Trade from IBM to AMD. Framework 185 via 305 resets through Framework JavaScript 110 and steps 306 and 307 the URL or each of application frame Quote and News to change symbol IBM to AMD. Trade 170 is also altered by calling a JavaScript function with the updated symbol 308. Chart 180 is not changed owing to lock of content at 210 specification. Therefore as shown in FIG. 6, request from the Quote frame or News frame leads via 401a, 402a respectively to a URL request to proxy server 220 for information pertaining to AMD which is obtained after requests to framework 185 via 401b, and 402b and consultation with parameter specification 210 instructs proxy server 220 via 401c and 402c to request data from application Quote.com 190 and application News.com 195 via 401d and 402d, which is provided at 401e and 402e and sent to Quote frame 160 at 401f, and News frame 165 via 402f.

STATEMENT REGARDING PREFERRED EMBODIMENTS

While the invention has been described with respect to preferred embodiments, those skilled in the art will readily appreciate that various changes and/or modifications can be made to the invention without departing from the spirit or scope of the invention as defined by the appended claims. All documents cited herein are incorporated by reference herein where appropriate for teachings of additional or alternative details, features and/or technical background.

We claim:

1. A method for communicating between a plurality of non-interfaced web-based applications within a common browser framework comprising:
   a framework server, in response to a user request, instructing a browser to create said common browser framework comprising a common parent framework domain, and a multiple of frames, each frame associated with an initially unique domain name of at least one of said plurality of non-interfaced web based applications;
   further instructing said common browser framework to modify said common parent framework domain and each of said initially unique domain names and to form new domain names for each of said at least one web based applications wherein each new domain name is a sub-domain of said common parent framework domain, a second-level domain name of said common parent is a web server second-level domain name, and domain parameters of the at least one of non-interfaced web-based applications are modified at said framework server;
   providing an executable program within said common browser framework configured to scan updated frame data and communicate said data between said multiple web based applications within said common browser framework;
   providing a location within said common browser framework of said executable program to each of said multiple web applications; and
   causing execution of said executable program.

2. The method of claim 1 wherein the common browser framework returns html content.

3. The method of claim 1 wherein the plurality of non-interfaced web-based applications are World Wide Web-based applications.

4. The method of claim 1 wherein the common browser framework is a thin framework.

5. The method of claim 1 wherein the common browser framework is a thick framework.

6. The method of claim 1 wherein the plurality of non-interfaced web-based applications are subdomains of a common parent domain on the server side.

7. The method of claim 1 wherein the plurality of non-interfaced web-based applications are accessed over an intranet.

8. The method of claim 1 wherein the plurality of non-interfaced web-based applications are accessed over the Internet.

9. The method in accordance with claim 1 wherein said modifying comprises changing each of said unique domain names into new domain names as follows:
   using said first-level domain name of each of said web applications as a new first-level domain name;
   using said second-level domain name of each of said web applications as a new third-level domain name;
   selecting a common parent second-level domain name and using it as a new second-level domain name for each of said web applications.

10. The method in accordance with claim 1 wherein said executable program is written in the JavaScript language.

11. The method in accordance with claim 1 wherein location is provided to each of said multiple web applications as a cookie.

12. A method for communicating between a plurality of non-interfaced web-based applications within a common browser framework comprising:
    a framework server, in response to a user request, instructing a browser to create said common browser framework comprising a common parent framework domain, and a multiple of frames, each frame associated with an initially unique domain name of at least one of said plurality of non-interfaced web based applications;
    further instructing said common browser framework to modify said common parent framework domain and each of said initially unique domain names and to form new domain names for each of said at least one web based applications wherein each new domain name is a sub-domain of said common parent framework domain, the plurality of non-interfaced web-based applications are subdomains of a common parent domain on the server side, and domain parameters of the at least one of non-interfaced web-based applications are modified at said framework server;
    providing an executable program within said common browser framework configured to scan updated frame data and communicate said data between said multiple web based applications within said common browser framework;
    providing a location within said common browser framework of said executable program to each of said multiple web applications; and
    causing execution of said executable program.

13. The method in accordance with claim 12 wherein said modifying comprises changing each of said unique domain names into new domain names as follows:
    using said first-level domain name of each of said web applications as a new first-level domain name;
    using said second-level domain name of each of said web applications as a new third-level domain name;
    selecting a common parent second-level domain name and using it as a new second-level domain name for each of said web applications.

14. The method in accordance with claim 12 wherein said executable program is written in the JavaScript language.

15. The method in accordance with claim 12 wherein location is provided to each of said multiple web applications as a cookie.

16. The method of claim 12 wherein the common browser framework returns html content.

17. The method of claim 12 wherein the plurality of non-interfaced web-based applications are World Wide Web-based applications.

18. The method of claim 12 wherein the common browser framework is a thin framework.

19. The method of claim 12 wherein the common browser framework is a thick framework.

20. The method of claim 12 wherein the plurality of non-interfaced web-based applications are accessed over an intranet.

21. The method of claim 12 wherein the plurality of non-interfaced web-based applications are accessed over the Internet.

* * * * *